J. T. A. GAUCHER, DEC'D.
A. GAUCHER, NÉE A. CERRÉ, EXECUTRIX.
ELECTRIC CLOCK.
APPLICATION FILED JUNE 26, 1920.
1,406,549.
Patented Feb. 14, 1922.
13 SHEETS—SHEET 3.
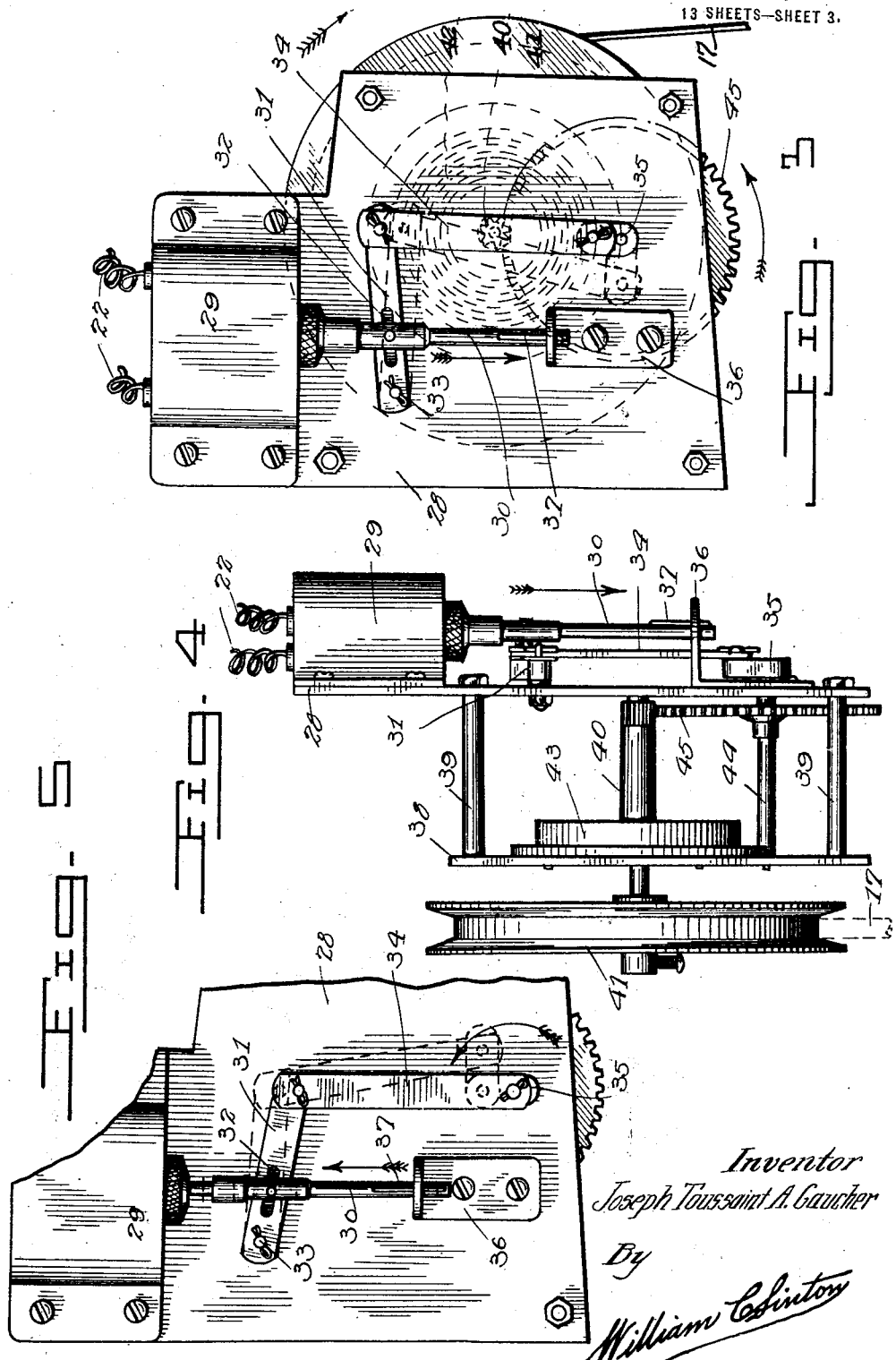
Inventor
Joseph Toussaint A. Gaucher
By
William Clinton
Attorney Inventor:
Joseph Toussaint A. Gaucher By William Clinton Attorney

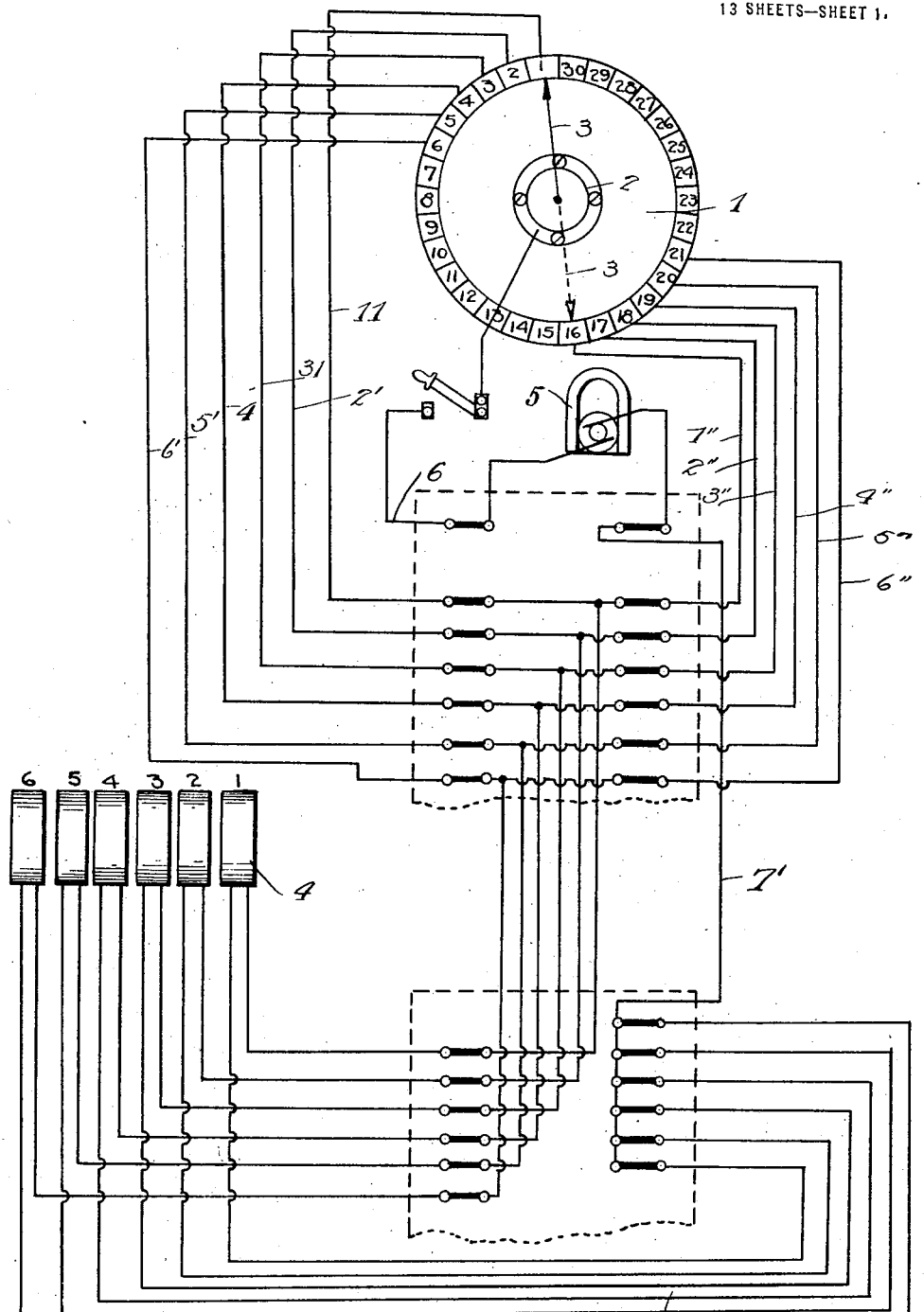

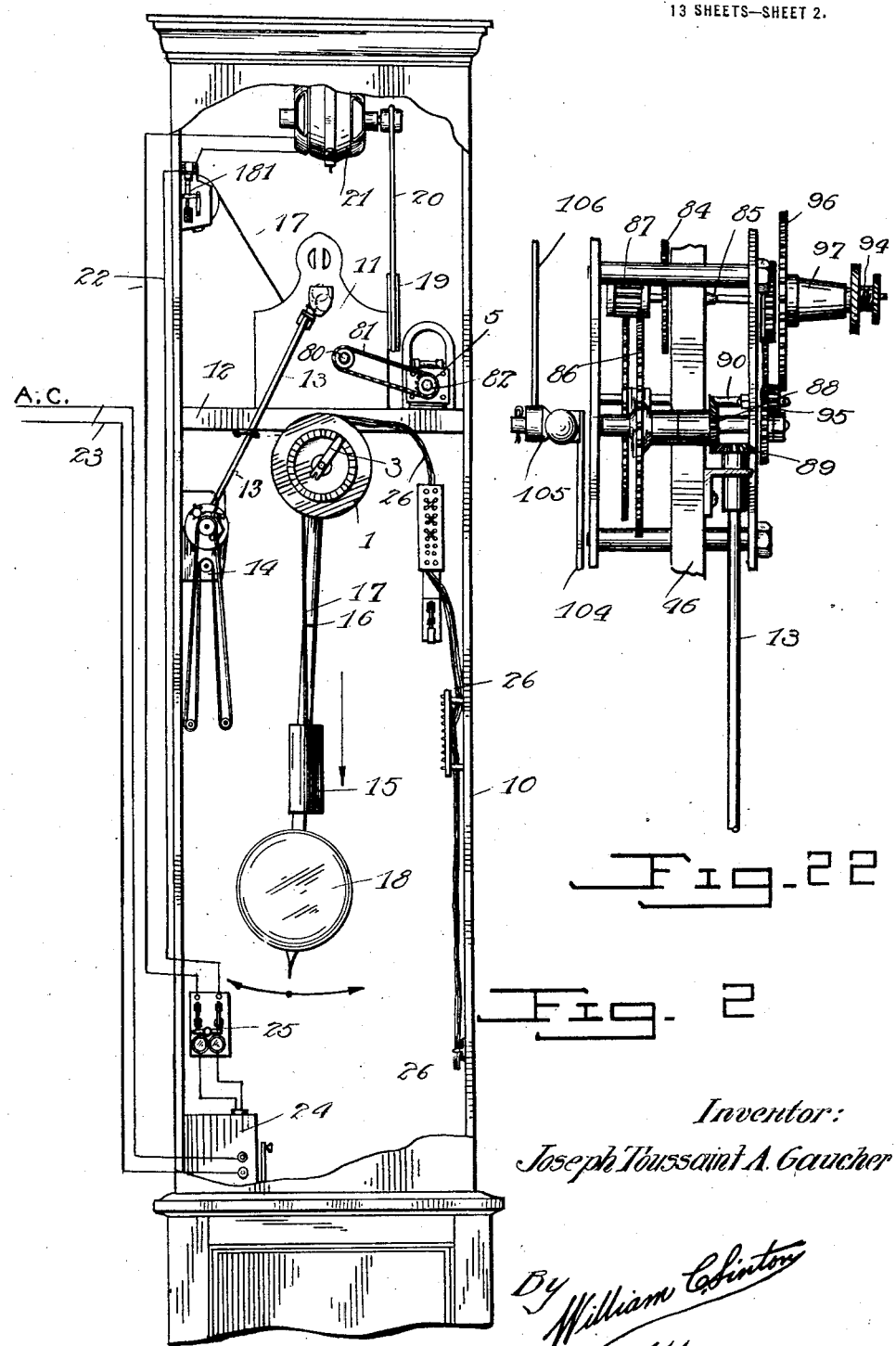

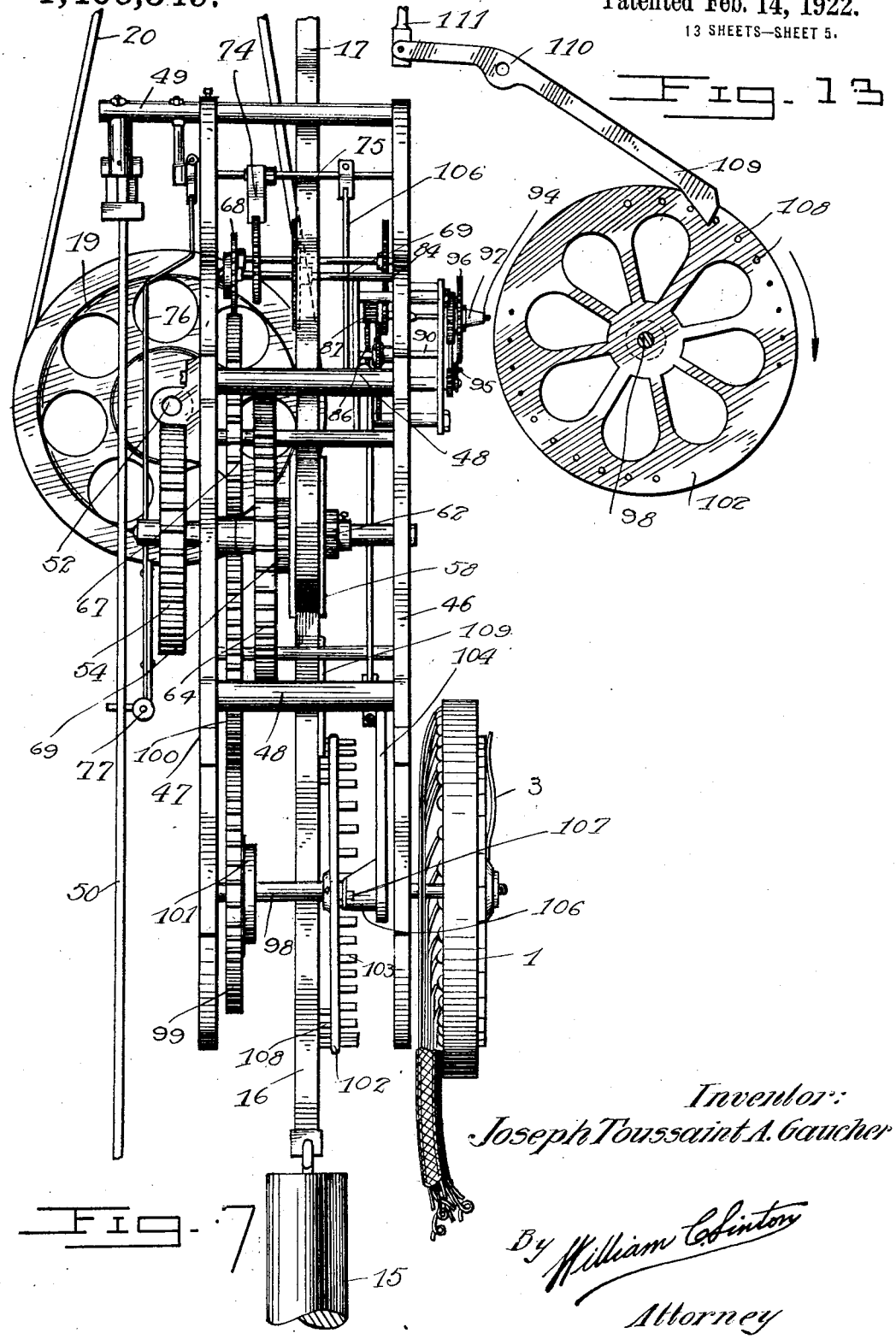

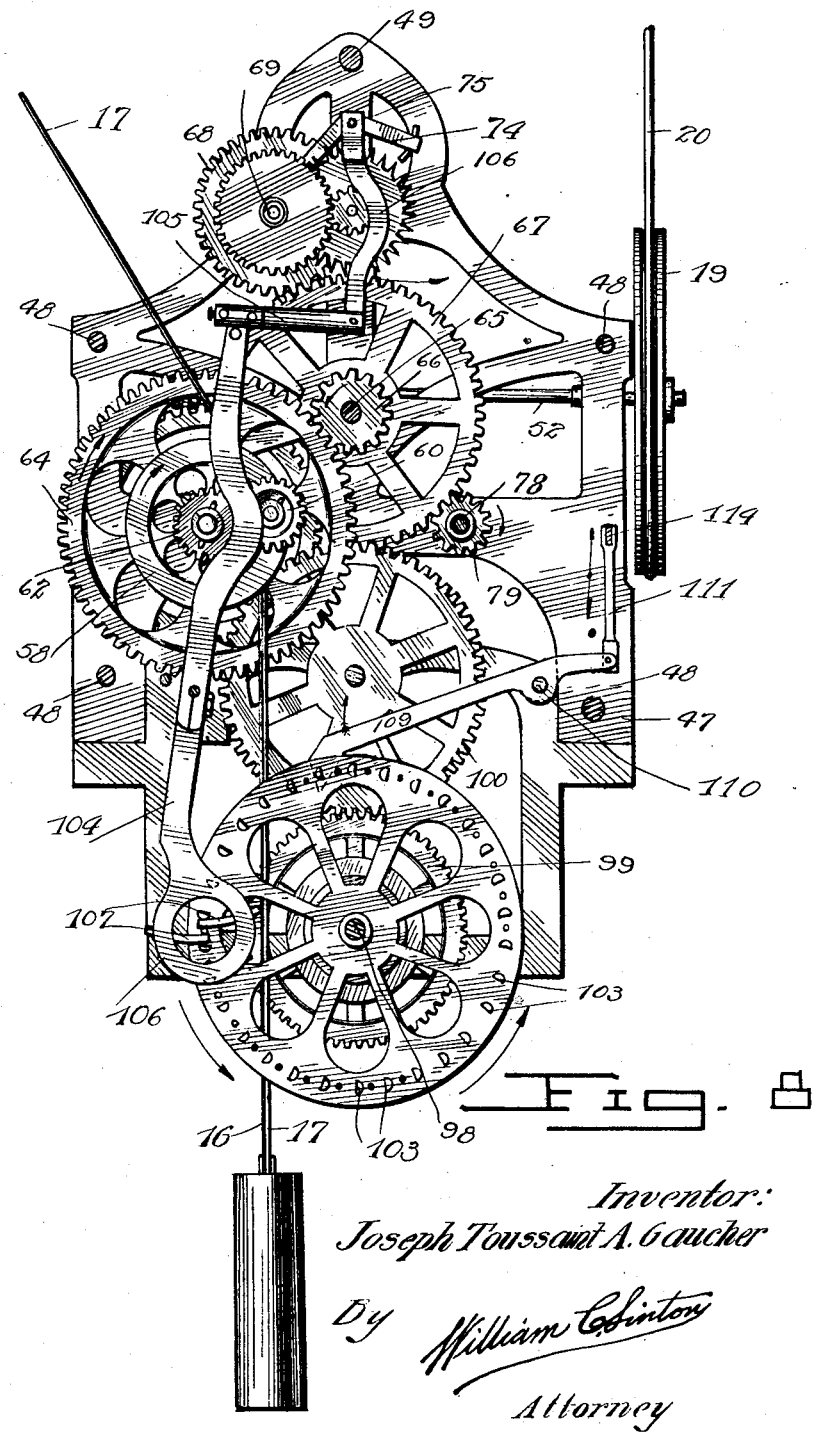

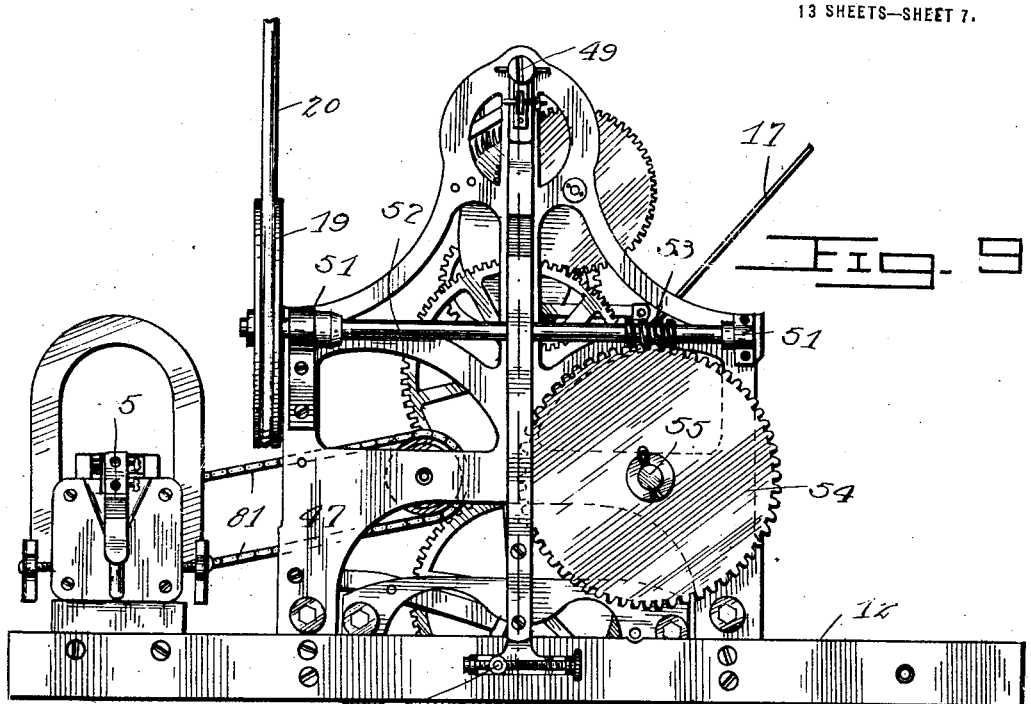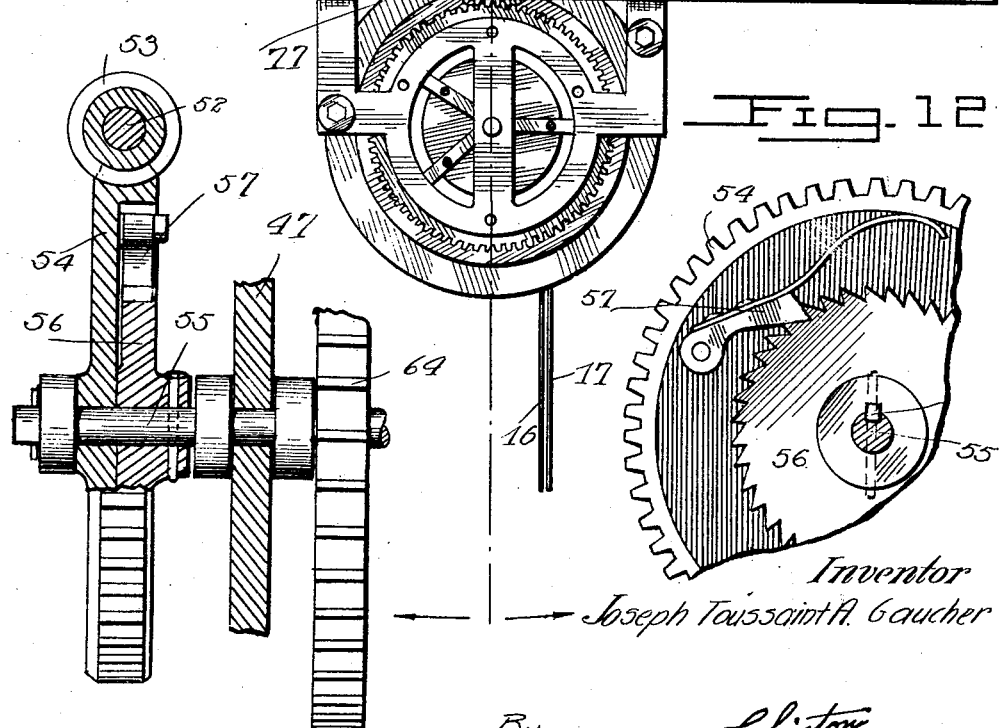

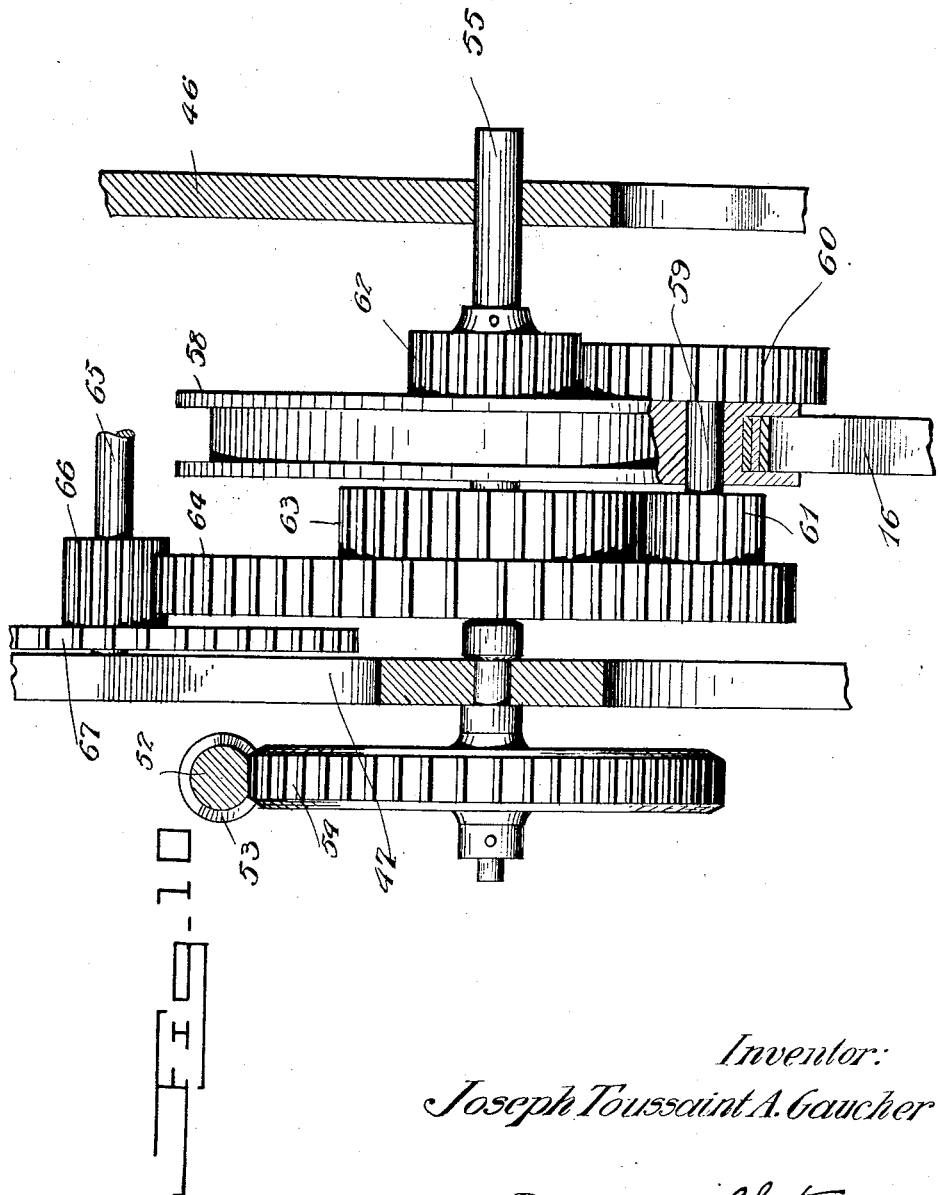

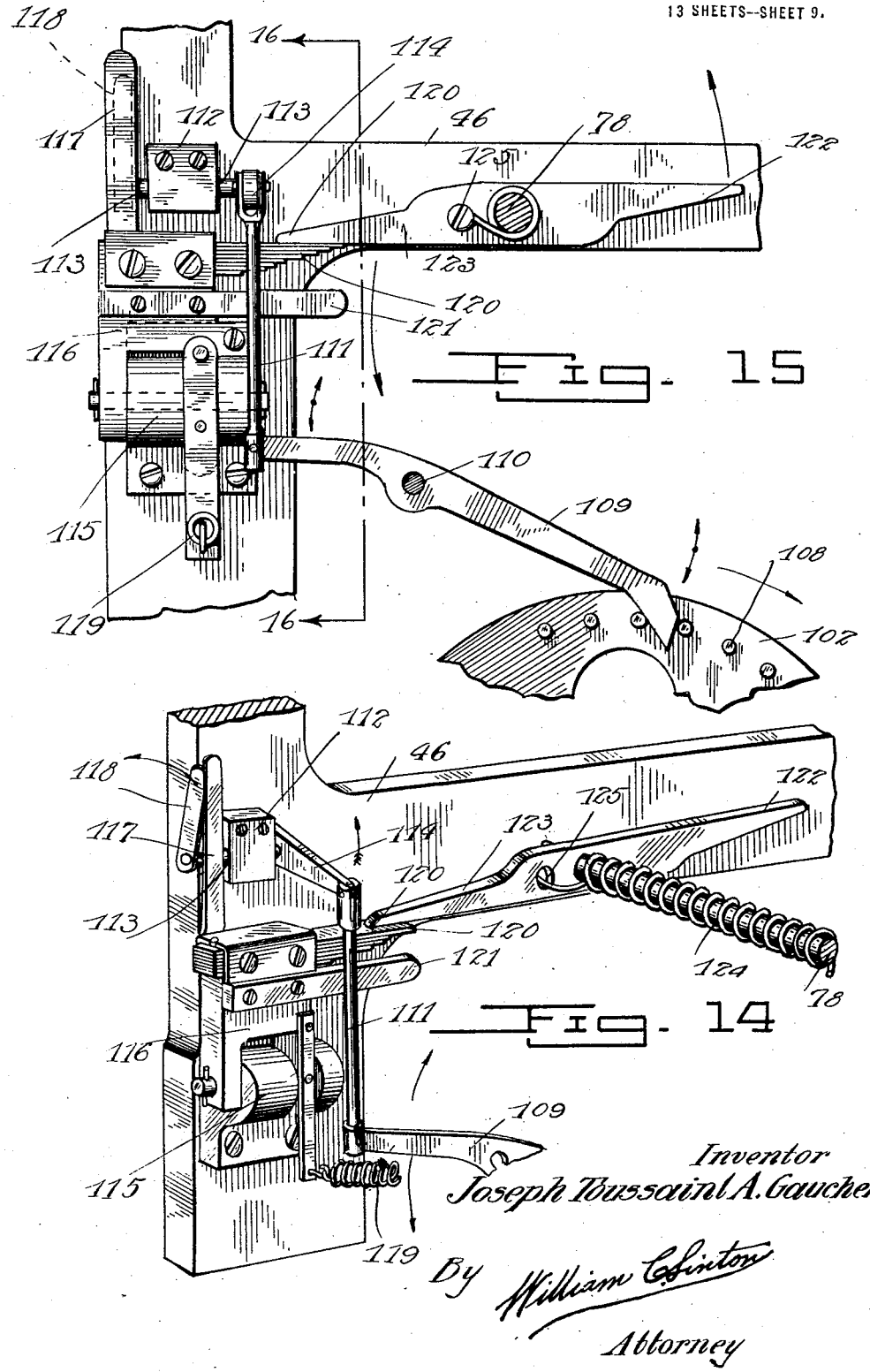

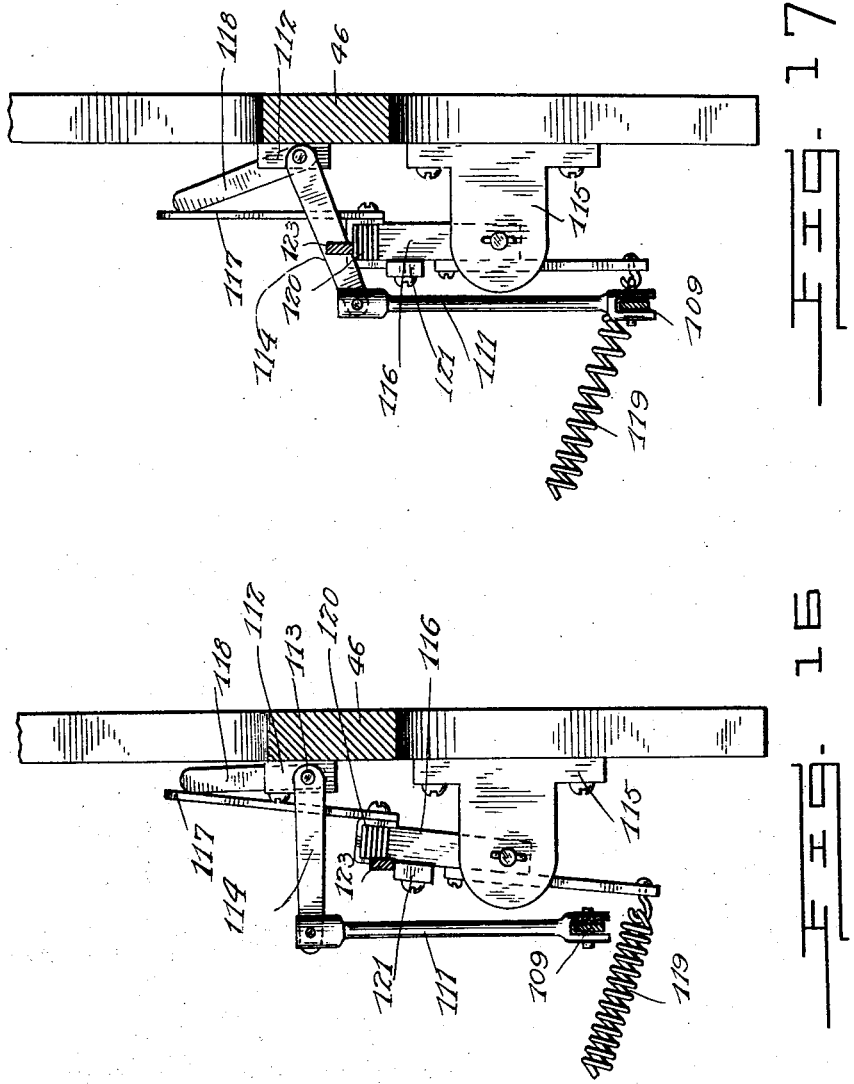

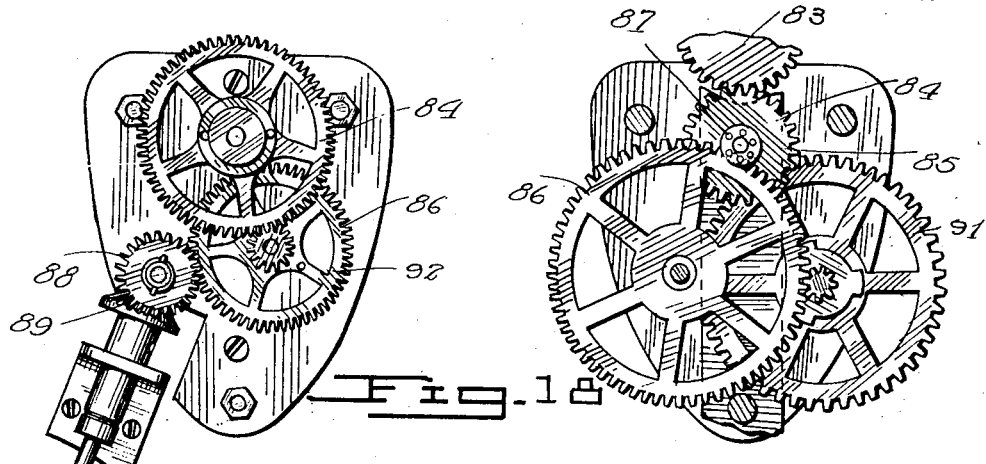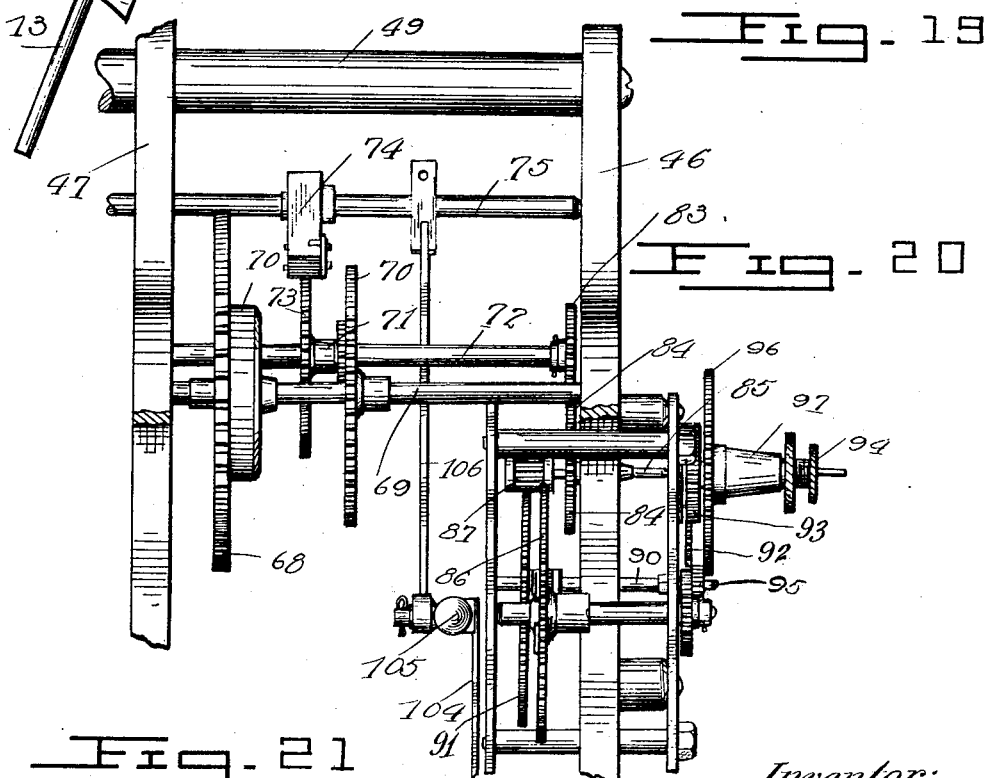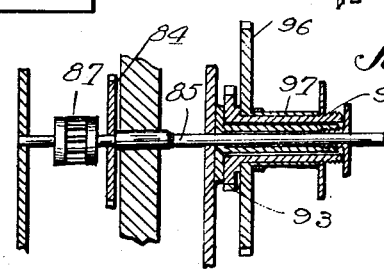

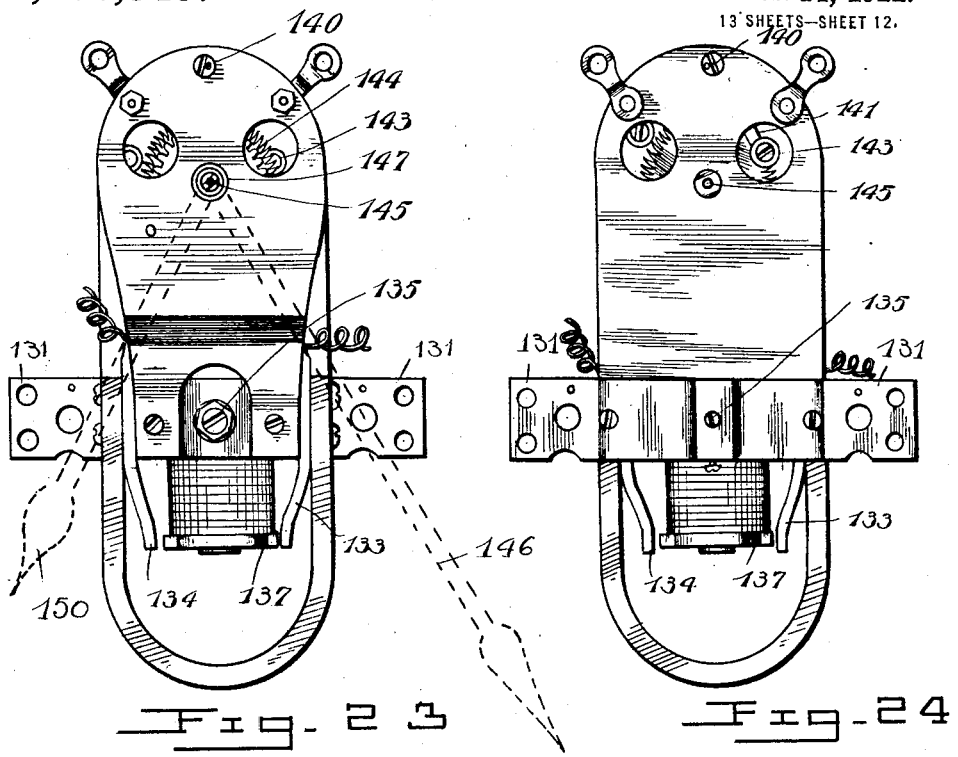
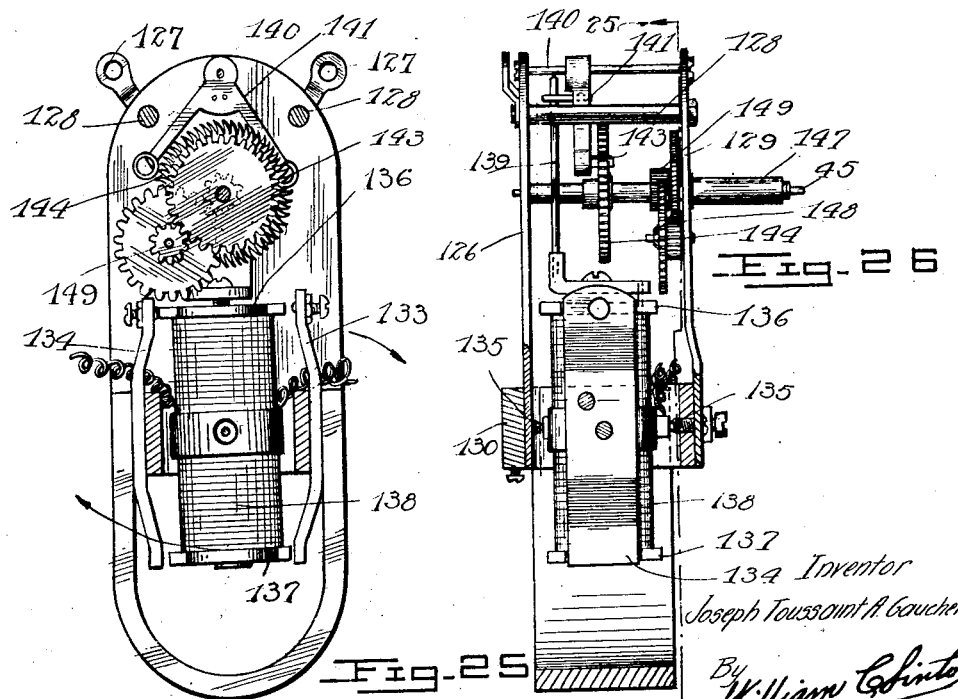

J. T. A. GAUCHER, DEC'D.
A. GAUCHER, NÉE A. CERRÉ, EXECUTRIX.
ELECTRIC CLOCK.
APPLICATION FILED JUNE 26, 1920.

1,406,549.

Patented Feb. 14, 1922.

Inventor
Joseph Toussaint A. Gaucher
By William C. Linton
Attorney

UNITED STATES PATENT OFFICE.

JOSEPH T. A. GAUCHER, DECEASED, BY ALBERTINE GAUCHER, NÉE ALBERTINE CERRÉ, EXECUTRIX, OF MONTREAL, CANADA.

ELECTRIC CLOCK.

1,406,549.   Specification of Letters Patent.   Patented Feb. 14, 1922.

Application filed June 26, 1920. Serial No. 392,026.

*To all whom it may concern:*

Be it known that I, ALBERTINE GAUCHER, subject of the King of Great Britain, and resident of Montreal, Province of Quebec, Canada, executrix of the estate of Joseph T. A. Gaucher, deceased, late a subject of the King of Great Britain, (as by reference to the duly-certified copy of letters of administration hereto annexed will more fully appear,) who has invented certain new and useful Improvements in Electric Clocks, do hereby declare that the following is a full, clear, and exact description of the invention, such as will enable others skilled in the art to which it appertains to make and use the same.

The present invention relates to electric clocks wherein a primary regulator is electrically connected in series with a plurality of secondary clocks so that the latter will be vitalized periodically by the movement of the master clock or the operation of the primary regulator, and these electric impulses transmitted to the secondary clocks at predetermined intervals, such as for instance once each half minute, cause the secondary clocks to move in unison whereby the time indicated upon the master clock will also be given upon the secondary clocks.

One of the principal purposes of the present invention is to establish a cascade system of clocks of the character aforesaid in which the variable power employed for setting the primary regulator in operation will not in any manner interfere with the precision of operation of the primary or secondary clocks.

A further object of the present invention is to provide a master clock which through its operation will control and generate a source of power for propelling the secondary clocks.

A still further object of the invention is the provision of means for independently regulating and transmitting power to each secondary clock, whereby one secondary clock will be operated at a time, thereby requiring but a comparatively small amount of electrical energy for propelling all of the secondary clocks.

A still further purpose of the invention is to provide an automatic rewinding means for the master clock which, when set in operation, will not in the least affect the motion of the master clock or the transmission of power to the secondary clocks.

With the above and other objects in view which will be apparent as the description continues, the invention consists of a master clock having a mechanism similar to that employed in the ordinary weight controlling clocks. The master clock is adapted to be automatically rewound and is connected in circuit with a plurality of secondary clocks so that the time registered upon the dial of the master clock will be transmitted to the secondary clocks. The invention further consists in means controlled and operated by a master clock whereby the electrical energy employed in the said circuit will be generated. The invention also further consists of a certain combination, formation and arrangement of parts as will be hereinafter more fully described and particularly pointed out in the appended claims.

Figure 1 is a diagrammatical view of the electrical system employed between the master clock and the secondary clocks;

Figure 2 is a diagrammatical view of the master clock showing the position of the relative parts in the clock casing;

Figure 3 is a detail side elevation of the switch and controlling means therefor which are included in circuit with the motor used for rewinding the master clock;

Figure 4 is a similar view taken at right angles to Figure 3;

Figure 5 is an enlarged detail view similar to Figure 3, illustrating another position of the switch controlling means;

Figure 7 is a side elevation of the same;

Figure 8 is a vertical longitudinal section through the same;

Figure 9 is a rear elevation of the same;

Figure 10 is a detail section view illustrating the planetary gearing employed between the master clock's driving means and the rewinding means;

Figure 11 is an enlarged detail section of the same;

Figure 12 is a detail elevation of one of the ratchet wheels taken at right angles to Figure 11;

Figure 13 is a large detail view of one of the escapement wheels;

Figure 14 is an enlarged detail perspective view of the escapement mechanism;

Figure 15 is a front elevation of the same;

Figure 16 is a detail view taken on the line 16—16 of Figure 15, showing one position of the escapement mechanism;

Figure 17 is a similar view showing another position of the escapement mechanism;

Figure 18 is an enlarged detail elevation of the gearing for driving the hands of the master clock;

Figure 19 is a similar view of another portion of the gearing employed;

Figure 20 is an enlarged detail side elevation of the gearing employed for driving the hands of the master clock;

Figure 21 is a detail section through the same;

Figure 22 is an enlarged detail side elevation of the same;

Figure 23 is a front elevation of the mechanism employed in one of the secondary clocks;

Figure 24 is a rear elevation of the same;

Figure 25 is a vertical detail section through the same taken on the line 25—25 of Figure 26;

Figure 26 is a vertical transverse section;

Referring now more particularly to the accompanying drawings wherein like and corresponding parts are designated by similar reference characters throughout the several views.

Figure 6:
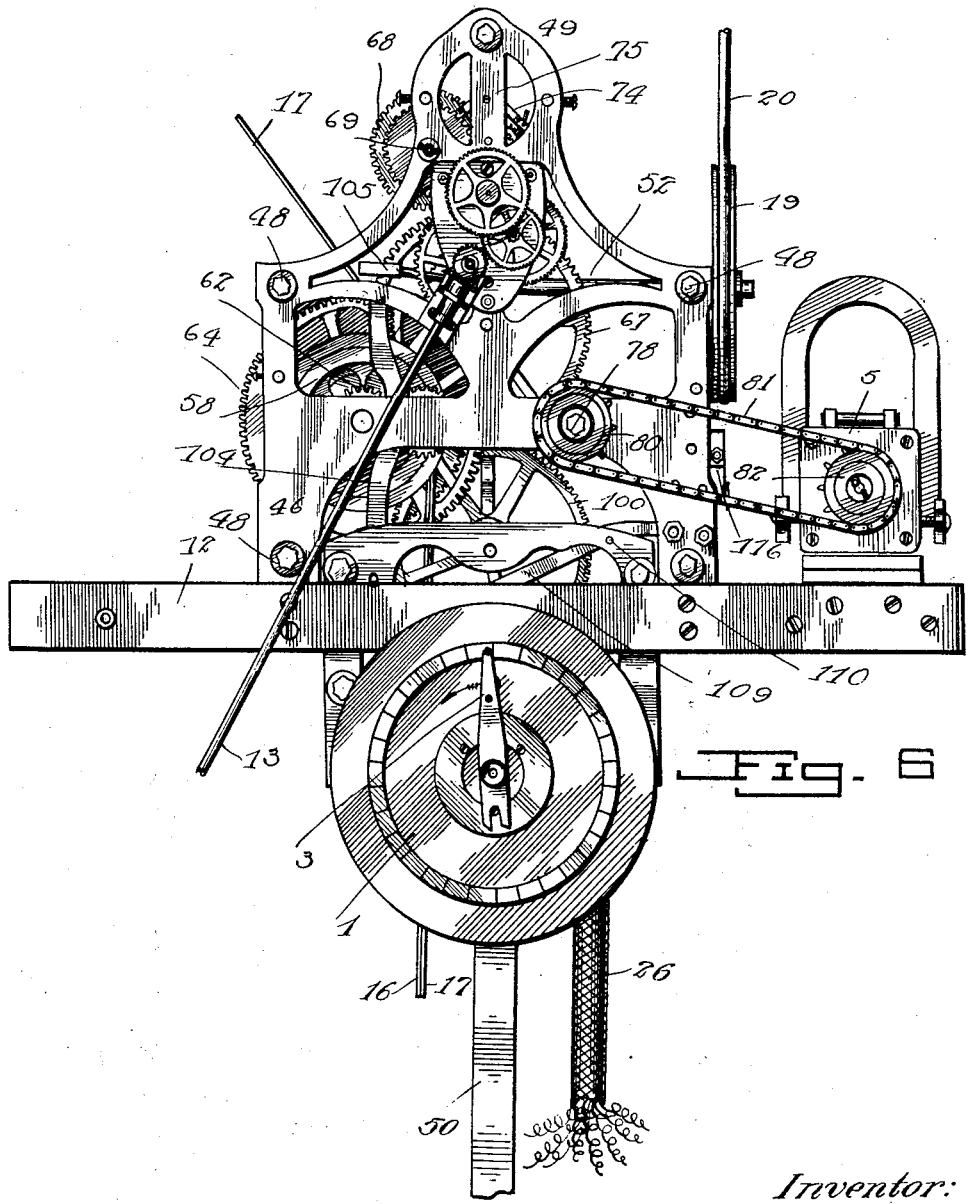
Figure 6 is a detail front elevation of the mechanism employed for driving the master clock.

The electrical system employed between the master clock and the secondary clocks is diagrammatically illustrated in Figure 1, in which the numeral 1 indicates a dial arranged upon the master clock and this dial is provided with a plurality of circumferentially arranged contacts which are numbered from 1 to 30 inclusive. A central contact 2 is employed and an indicator or pointer 3 extends from the central contact to the circumferentially arranged contacts. This hand or indicator 3 makes one complete revolution at each minute the master clock runs. The secondary clocks are indicated by the numeral 4, and whereas six of these secondary clocks are shown, of course, it is to be understood that any number may be employed according to the outer contacts upon the dial 1. A generator 5 is driven by the master clock and supplies alternating current to an electro-magnet within each secondary clock whereby the alternating current transmitted to each secondary clock will every thirty seconds move the secondary clocks. Leading from this generator 5 is a wire 6 having a switch 7 therein which is connected to the contact 2. A wire 1' leads from the contact No. 1 upon the dial 1 to the first secondary clock, and likewise lines 2' to 6' inclusive extend to the remaining secondary clocks. Leading from the contact 16 upon the dial 1 is a line 1'' which is also in circuit and connected with the line 1'. Lines 2'' to 6'' inclusive extend from the respective contacts upon the dial 1 and are electrically connected to the lines 2' to 6' inclusive. Also in circuit with the generator 5 is a line 7' and the return wires 8 of the secondary clocks are connected in parallel with the generator.

When the master clock is set in motion and the switch 7 is closed, the current generated from the generator 5 will pass to the secondary clocks in the following manner. Upon the first half revolution of the generator, the current will pass through the wire 6 through the indicator 3 to the contact 1 upon the dial 1 from where it will pass through the line 1' to the first secondary clock 4. The current, as it passes through this first secondary clock, will move the minute hand thereof a distance representing one half minute. The current will then flow from the first secondary clock through its return wire 8 to the wire 7 and then to the generator 5 where it completes its circuit. When the indicator 3 is in the position as shown in dotted lines, the current generator will flow in an alternate direction so that it will pass through the wire 1'' to the negative poles of the electro-magnet contained within the first secondary clock whereby the minute hand of this secondary clock will be moved another half minute.

From the foregoing, it will be apparent that upon the first half revolution of the indicator 3, each of the secondary clocks will be moved one half minute and the full minute of movement will be completed upon the last half revolution of the hand 3. Therefore, as the hand 3 makes one complete revolution every minute, the minute hand of each secondary clock will be moved twice each minute, so that it will indicate the minute and half minute time upon the dials of the secondary clocks. As the generator transmits alternating current to the respective secondary clocks, this current will be supplied alternately to the respective poles of the electro-magnets contained within each secondary clock, so that a swinging core or solenoid within the secondary clocks, which will be later described, will be moved for operating the hands of the secondary clocks.

The master clock which drives the generator 5 and the hand 3 is arranged within a suitable casing 10, as is illustrated in Figure 2. The clock mechanism is supported within a suitable casing 11 mounted upon a support 12 and this clock mechanism has operatively connected thereto a shaft 13 which latter is employed for driving a time striking mechanism such as the chimes or the like, or it may be employed for driving the dials of calenders or the like and which mechanism is indicated by the numeral 14 but forms no part of the present invention. The clock mechanism is driven by a weight 15 which is suspended by means of a strap or band 16, and also connected to this weight 15 is a similar band or strap 17 employed for operating an electric switch 18'. A pendulum 18 also controls the movement of the clock mechanism 11. The clock mechanism has operatively connected thereto a pulley 19 over which passes a belt 20 and the latter passes over a pulley carried by an electric motor 21. This motor has leading thereto the wires 22 and has also in circuit therewith the switch 18'. A suitable source of electrical energy is supplied through the wires 23 to a transformer 24 supported within the casing 10 and the current passes from this transformer through a switch 25 to the wires 22. As the weight 15 of the clock mechanism descends, it will cause the clock mechanism to be set in operation in the usual manner, but when this weight has descended within the casing 10 approximately to a point indicated by the numeral 26, the strap 17 will close the switch 18' whereby current will be supplied to the motor 21. When this motor 21 is set in motion, the weight 15 will be drawn upwardly until it has been completely rewound, at which time the switch 18' is open thereby breaking the circuit in which the motor 21 is included. However, during the rewinding period of the clock mechanism, the master clock as well as the secondary clocks continue on with their operations, so that no time is lost, and in fact the rewinding movement of the master clock in no way affects the time controlling mechanism of any of the clocks. It will also be noted that if a variable output of current is supplied to the motor 21 and which in turn would cause an irregular rewinding of the clock mechanism, the time controlling mechanism of the clock would be in no way affected. When the weight 15 descends to approximately the point indicated by the numeral 26, the switch 18' will be closed, but should, for some unforeseen reason, sufficient current not be supplied to the motor 21 when switch 18' is closed, the weight 15 could continue with its downward travel beyond the line 26 so as to keep the clock in motion for a reasonable length of time, or fifteen to twenty minutes until the proper amount of current could be supplied to the motor 21, or other means employed for raising the weight 15 so that the continual movement of the clock mechanism would not be interfered with. The wires indicated by the numeral 27 extend from the dial 1 to the secondary clocks.

The switch 18' is shown in detail in Figures 3 to 5 inclusive. Supported within the casing 10 is a plate 28 having secured to one face thereof a casing 29 in which is arranged the switch 18'. This switch is provided with a vertical movable stem 30, and the latter is connected to a link 31 by means of a slot and pin connection 32, as shown, and this link 31 is pivotally supported upon the plate 28 as at 33. A link 34 is also connected to the link 31 and the lower end of this link 34 is connected to a link 35. Projecting from the plate 28 is a bracket 36 and the lower end of the stem 30 travels through an opening within this bracket. This stem is also provided with a projection 37 which prevents the stem from rotating. Secured to the plate 28 is a plate 38 and this plate 38 is supported in spaced relation with the plate 28 by means of the bars 39. A driven shaft 40 is journalled within these plates 28 and 38 and has keyed to one end thereof a pulley 41 upon which is wound a strap 17. A coil spring 42 is arranged within the casing 43 secured to the plate 38 and this coil spring 42 has one end connected to the casing 43 and its opposite end connected to the shaft 40, so that upon the unwinding movement of the shaft 40 which is caused by the weight 15 descending, the tension of the spring 43 will be increased for storing up power, so that when the clock mechanism is rewound or the weight 15 drawn upwardly, this spring will rotate the shaft 40 so that the band 17 will be wound upon the pulley 41. Also journalled within the plates 28 and 38 is a shaft 44 which has keyed to one end thereof the crank 35 and has also connected thereto a gear 45 which meshes with a pinion 46 carried by the shaft 40. Upon the downward travel of the weight 15, the shaft 40 as well as the pulley 41 will travel in the direction of the arrow, as shown in Figure 3, whereby the shaft 44 will be rotated in the direction of the arrow, as is also shown in Figure 3, so that the crank 35 will exert a downward pull upon the stem 30. When the weight 15 has reached the point 26, the crank 35 will assume the position as is illustrated in Figure 5, whereby the stem will be pulled to its lowermost position and the switch 18' closed. When this switch 18' is closed, the motor 21 is set in motion for rewinding or drawing upwardly the weight 15. As the pull upon the shaft 40 is released, the spring 42 during this rewinding period will cause the shaft 40 to revolve in an opposite direction whereby the released strap 17 will be wound upon the pulley 41 and the crank 35 caused to revolve in the direction of the arrow, as shown in Figure 5. This crank 35, through the mechanism formerly described, will exert an upward push upon the stem 30, and when the weight 15 has assumed its uppermost position, this stem 30 will open the switch 18' whereby the current to the motor 21 will be cut off and the weight 15 will be allowed to descend.

The clock mechanism is supported upon a suitable framework which latter is mounted upon the platform 12 supported within the casing 10 and this framework consists of a front plate 46 and a rear plate 47 which are connected and braced in spaced relation by means of the cross bars 48. Connected to the projecting end of the uppermost cross bar 49 is a depending arm 50 which carries at its lower end the pendulum 18. Journalled within the bearings 51 is a transversely extending shaft 52 having keyed thereto the pulley 19 and this shaft 52 is provided with a worm gear 53 which is adapted to mesh with a gear 54. Journalled within the plates 46 and 47 is a shaft 55 and the gear 54 is loosely mounted upon this shaft 55. A ratchet wheel 56 is keyed to this shaft 55 and the gear 54 is provided with a spring connected pawl 57 which engages the ratchet wheel 56 so as to permit the shaft 55 to move in one direction, but should the gear 54 move in an opposite direction the shaft 55 will be caused to travel therewith. Also loosely mounted upon this shaft 55 is a pulley 58 upon which is adapted to be wound the strap 16. This pulley 58 has journalled therein a shaft 59 and the latter has keyed thereto the pinions 60 and 61. These pinions 60 and 61 are adapted to mesh with similar gears 62 and 63 respectively. The gear 62 is keyed to the shaft 55, whereas the gear 63 is loosely mounted upon the shaft 55 and has formed therewith a large gear 64. From this planetary arrangement of gears, it is obvious that when the shaft 52 is revolved by the motor 21, the shaft 55 may be rotated in one direction for winding the band 16 upon the pulley 58, and when this band 16 has been fully wound upon the pulley, the weight 15 will cause the pulley to revolve in an opposite direction, whereby power will be transmitted to the larger gear 64. It will also be further noted that during the rewinding period, power will still be transmitted to this gear 64 whereby the clock mechanism will be continuously kept in motion.

Also journalled within the supports 46 and 47 shown in Figure 20 is a shaft 65 which has keyed thereto a pinion 66 and the latter meshes with the gear 64. This pinion 66 has formed therewith a gear 67 and the latter meshes with a gear 68 which is loosely mounted upon a shaft 69. This gear 68 has connected thereto a casing 70 in which is arranged a coil spring which operatively connects the gear 68 with the shaft 69 and which spring stores up sufficient power for rotating the shaft 69. This shaft 69 has keyed thereto a gear 70' which meshes with a pinion 71 carried by the shaft 72, which latter is also journalled within suitable bearings arranged within the supports 46 and 47. Keyed to this shaft 72 is an escapement wheel 73 which is engaged by the verge 74, and the latter is secured to an oscillating shaft 75. This oscillating shaft 75 is journalled within suitable bearings arranged within the supports 46 and 47 and has connected to its outer end a link or arm 76. The lower end of this arm 76 is adjustably connected, as at 77, to the pendulum lever 50, so that when the pendulum is set in motion, the verge 74 will be operated for permitting the power stored up in the shaft 69 to revolve the shaft 72.

A suitable shaft 78 shown in Figure 8 is also journalled within the supports 46 and 47 and has keyed thereto a gear 79 which meshes with the gear 67. This shaft 78 has connected thereto a sprocket wheel 80 shown in Figure 6 over which passes a sprocket chain 81 and the latter passes over a sprocket wheel 82 connected to the generator 5, so that the power stored up within the clock mechanism may be used for propelling the generator, and the output of this generator is employed for operating the secondary clocks.

The shaft 72 shown in Figure 10 is provided with a gear 83 which meshes with a gear 84 carried by a shaft 85 which is journalled within suitable bearings carried by the support 46. A gear 86 meshes with a gear 87 carried by the shaft 85, and is adapted to rotate a bevelled gear 88 shown in Figure 18 which meshes with a bevelled gear 89 carried by the shaft 13 whereby the latter may be rotated. A shaft 90 is also employed and carries a gear 91 which meshes with the gear 87 so that this shaft 90 may also be rotated. Carried by the outer end of this shaft 90 is a large gear 92 which is adapted to mesh with a small gear 93 carried by the sleeve 94 to which the larger or minute hand is connected. A smaller gear 95 meshes with the gear 96 and the latter carries the sleeve 97 to which is connected the smaller or hour hand of the master clock. From this mechanism it is evident that the minute and hour hands of the master clock may be propelled for indicating the time upon the clock dial.

Journalled within the lower ends of the supports 46 and 47 is a shaft 98 to which is connected the indicator 3. This shaft has loosely mounted thereupon a gear 99 which is in mesh with the gear 100 and this gear 100 meshes with the gear 67. This gear 99 carries a casing 101 in which is arranged a coil spring which connects the gear to the shaft 98 and stores up the power transmitted to the gear 99 so that this power may be employed for rotating the shaft 98 at the proper intervals. Keyed to this shaft 98 is a disk 102 and this disk has projecting from one face thereof a plurality of pins 103 which are semi-circular in cross section, as shown. A depending lever 104 is provided and is connected through the horizontal bar 105 to a lever 106, and the latter is secured to the shaft 75, so that upon the oscillatory movement of this shaft 75, a swinging movement will be given the lever 104. The lower end of this lever 104 is provided with a ring 106' in which are projecting the curved arms or pins 107 and these arms 107 are adapted to travel between the pins 103, so that upon each swinging movement of the lever 104, the disk 102 will be permitted to travel the distance between these pins 103 so as to move the dial 1 for bringing the indicator 3 in contact with each circumferential contact arranged upon the face of the dial 1.

The opposite face of this disk 102 is provided with a plurality of pins 108 which pins are engaged by one end of a lever 109 shown in Figure 15. This lever 109 is pivotally supported, as at 110, to the frame 46 and has connected to its opposite end a link 111. Journalled within a bearing 112 carried by the support 46 is a shaft 113 which carries a crank arm 114 and the latter being connected to the link 111. Also carried by this support 46 is a bracket 115 and pivotally supported upon this bracket 115 is a swinging escapement block or table 116. This block 116 is provided with a vertically extending arm 117 and adapted to contact with this arm 117 is a crank arm 118 carried by the shaft 113. A coil spring 119 is employed for normally holding this escapement table in the position as illustrated in Figure 16, but when the shaft 113 is oscillated so that the arm 118 may exert a force upon the extension 117, this escapement table will be rocked or moved to the position as illustrated in Figure 17. This escapement table is provided with an upper platform 120 formed of a plurality of leaf springs and a lower platform 121 which is arranged at one side of the platform 120. Loosely mounted upon the shaft 78 is a revolving escapement arm having the diametrically opposite projections 122 and 123. A coil spring 124 encircles this shaft 78 and has one end connected to this shaft, whereas the opposite end thereof is connected to the escapement arm as at 125. The power transmitted from the weight 15 through the clock gearing is partly stored up within this coil spring 124 by the rotation of the shaft 78, and when either projection of this escapement arm is released, it will permit this shaft 78 to revolve. For releasing this escapement arm, the pins 108 are provided. These pins 108, during the rotation of the disk 102 in the direction of the arrow, as shown in Figure 13, cause the lever 109 to oscillate. When this lever 109 oscillates so as to pull downwardly upon the link 111, the escapement table 116 will be moved so that one of the projections 122 or 123 will fall upon the upper platform 120. When this lever 109 has passed over the approaching pin 108, the coil spring 119 will exert a pull upon the table 116, causing the same to assume the position as shown in Figure 16, and the lever 109 will again rest between the pins 108, as is better illustrated in Figure 15. When this table 116 has been moved to the position as illustrated in Figure 16, the projection 123 of the escapement lever will fall upon the lower platform 121, again stopping the rotation of the escapement arm. As the escapement table is again moved to the position as shown in Figure 17, the projection 123 of the escapement lever will travel from the platform 121 and fall below the platform 120 where it will be released and the coil spring will exert a pull thereupon, so that the escapement arm may make a complete half revolution or until the opposite end 122 of the escapement arm strikes the platform 120.

Figure 27:
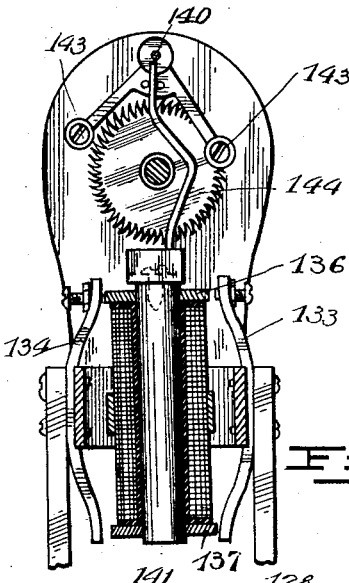
Figure 27 is a detail vertical section showing one position of the moving coil.
Figure 28:
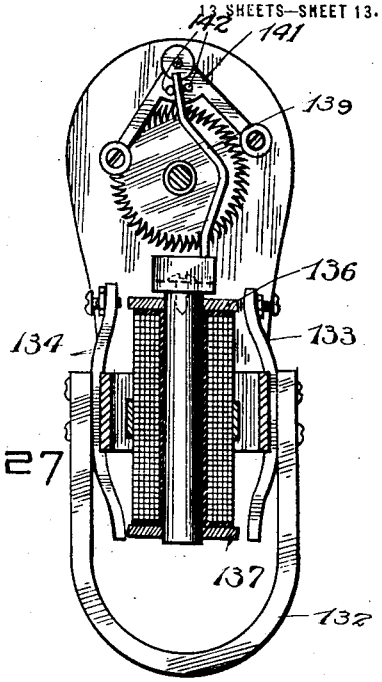
Figure 28 is a similar view showing another position thereof.
Figure 29:
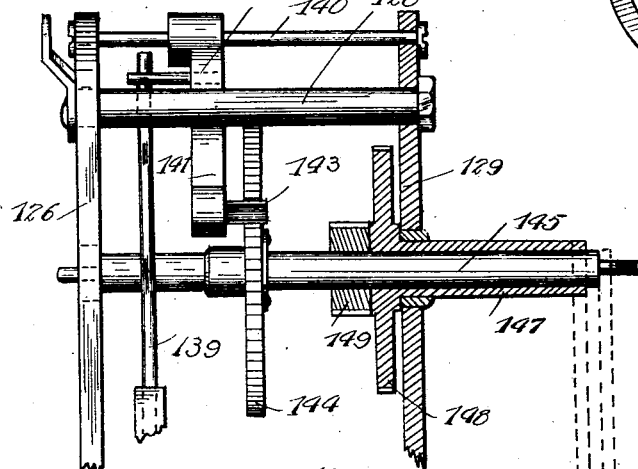
Figure 29 is an enlarged detail view showing the escapement mechanism in side elevation; and, Figure 30 is a detail elevation of the escapement mechanism.
Figure 30:
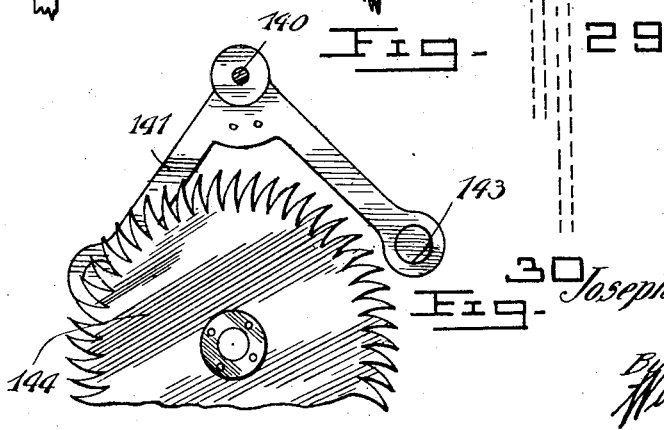

Arranged within each secondary clock is a mechanism for rotating the minute and hour hands of such clocks, and this mechanism is electrically operated. This mechanism, as is better illustrated in Figures 23 to 30 inclusive, comprises a rear plate 126 which may be supported by means of the eyelets 127 to the casing of the secondary clock, and retained in spaced relation by means of the bars 128 is a branch supporting plate 129. The lower ends of these plates are secured to a block or casting 130 which is provided with the projections 131 and the latter having openings therein through which screws or other suitable fasteners may extend for securing the casting to the frame of the clock. Secured to this casting 130 is a permanent horse shoe magnet 132 which has secured to the ends thereof the vertically extending keepers 133 and 134, and each keeper is made preferably of a soft iron plate adapted to be energized by the magnet 132. These keepers each form a continuation of the magnet, one representing the north or positive pole and the other the south or negative pole. Pivotally connected as at 135 to the casting 130 is the core of an electro-magnet having the coils wound therearound and these coils terminating in an upper plate 136 and a lower plate 137. These plates are adapted to contact with the plates 133 and 134, so as to swing this core 138 upon its pivoted connection 135. Connected to this core 138 is a vertically extending arm 139. Supported within the plates 126 and 129 is an oscillating shaft 140 which carries an escapement 141 and this arm 139 extends between the pins 142 carried by this escapement 141 so that upon the oscillation of the core 138 this escapement will be oscillated. The arms of this escapement are provided with the projecting pins 143 which are adapted to engage the teeth of the escapement wheel 144, so that upon the oscillatory movement of this escapement, the escapement wheel 144 will be rotated. This escapement wheel 144 is keyed to a shaft 145 and adapted to be secured to the outer end of this shaft 145 is the larger or minute hand 146. Encircling this shaft 145 is a sleeve 147 which has formed therewith a gear 148. This gear 148 is operatively connected through the gearing 149 to the shaft 145. The hour or smaller hand 150 is connected to this sleeve 147. Therefore, it is apparent that the alternating current, as supplied from the generator 5, will pass through the coils of the core 138 and likewise the poles of the core will alternately change so that the plates 136 and 137 will be attracted to the keepers 133 and 134 whereby the core will be oscillated and this oscillating movement will, through the mechanism described, cause the hands upon the dials of the secondary clocks to be rotated. As electric current is supplied every half minute to the cores of the secondary clocks, these cores will first assume the position as is better illustrated in Figure 27, so that the shaft 145 will be oscillated to move the minute hand upon the dial a distance of one half minute. When the current is again supplied to the coil 138, it will travel in an opposite direction, thereby causing the coil to swing to the position as shown in Figure 28, and upon each swinging movement of the core 138, the shaft 145 will be rotated to move the hands upon the dials of the secondary clocks, whereby the time recorded upon the primary clock may be transmitted to many secondary clocks.

From the foregoing, it will be apparent that when the pendulum 18 is set in motion, the shaft 75 will be oscillated and this movement will be continued as long as power is applied to the shaft 69. Power is supplied to the various mechanisms as follows: As the weight 15 descends, it rotates the pulley 58 in the direction of the arrow, as is illustrated in Figure 8, whereby the pinion 60 will travel around the pinion 62, as the shaft 55 is stationary. The pinion 61 which is connected to the pinion 60 will then be locked with the gear 63, so that the gear 64 will travel in the same direction as the pulley 58. This gear 64 rotates the shaft 66, and through the gearing, as shown, the power is transmitted to the shaft 69. In rewinding or raising the weight 15, the motor 21 is set in motion whereby the shaft 55 is rotated through the gearing as formerly described. When this shaft 55 is rotated, the pulley 58 will travel therewith due to the planetary gearing, but the gear 64 will continue in its same direction of travel and the counter-clockwise movement of the pulley 58 will transmit the power to this gear 64, so that during the rewinding period the clock mechanism may continue with its movement. Upon each oscillation of the shaft 75, the shaft 98 will be moved the distance between the pins 103 carried by the disk 102, so that the movable contact 3 will be placed upon the next adjacent circumferential contact upon the dial 1 for completing a circuit in which one of the secondary clocks is included. Upon the movement of the disk 102, the lever 109 will be operated so that the escapement table 116 may be moved to release the escapement arm mounted upon the shaft 78. Upon each release of this escapement arm, it is permitted to turn one half revolution, and as the generator 5 is connected to this shaft, the armature of the generator will turn one half revolution, thereby sending a small amount of current into the positive or negative poles of one of the cores 138 in the secondary clocks. Therefore, during the continual operation of the clock mechanism, shaft 98 makes one complete revolution every minute, that is every second the shaft 78 makes a half revolution, so that alternating current may be supplied to the secondary clocks and each secondary clock is moved twice during each complete revolution of the shaft 98, and in this manner the time indicated upon the dial of a master clock may be transmitted to a plurality of secondary clocks.

Having thus fully described my invention, what I claim as new and desire to secure by Letters Patent is:

1. A system of electrical clocks comprising a primary regulator, a generator propelled by said primary regulator, a plurality of secondary clocks, electrical connections between said secondary clocks and said primary regulator, said generator adapted to supply current to said electrical connections, and means operated by said primary regulator for distributing the flow of current from said generator to only one of the said secondary clocks at the time.

2. In a system of electric clocks provided with a master clock, provided with an alternating current generator, the combination with a dial having a plurality of circumferential contacts, a plurality of secondary clocks, an electrical connection between each clock and two of the contacts upon said dial, a rotating contact included in the circuit and adapted to engage said circumferential contacts whereby the current will be supplied to said secondary clocks, substantially as and for the purpose specified.

3. The combination with a master clock having mechanical means for propelling the same, provided with means for generating alternating current, a plurality of secondary clocks, electrical circuits operatively connecting said master clock with said secondary clocks, a rotary contact member propelled by said master clock for controlling the supply of alternating current to said secondary clocks, whereby the time registered upon said master clock may be transmitted to said secondary clocks.

4. An electric clock system comprising a master clock, provided with a generator of electricity, a plurality of secondary clocks, electric circuits establishing an electrical connection between said master clock and said secondary clocks, said master clock adapted to operate said generator and control the electrical energy supplied to said secondary clocks whereby each secondary clock will be operated independently and separately, substantially as and for the purpose specified.

In witness whereof I have hereunto set my hand.

ALBERTINE GAUCHER née ALBERTINE CERRÉ,
*Administratrix of Joseph T. A. Gaucher, deceased.*